(12) United States Patent
Nakanishi

(10) Patent No.: US 7,839,020 B2
(45) Date of Patent: Nov. 23, 2010

(54) ELECTRIC POWER SUPPLY SYSTEM

(75) Inventor: Osamu Nakanishi, Obu (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 304 days.

(21) Appl. No.: 11/908,624

(22) PCT Filed: Apr. 21, 2006

(86) PCT No.: PCT/JP2006/308420

§ 371 (c)(1),
(2), (4) Date: Oct. 5, 2007

(87) PCT Pub. No.: WO2006/115201

PCT Pub. Date: Nov. 2, 2006

(65) Prior Publication Data

US 2009/0026841 A1 Jan. 29, 2009

(30) Foreign Application Priority Data

Apr. 22, 2005 (JP) ............................. 2005-124601
Apr. 20, 2006 (JP) ............................. 2006-116695

(51) Int. Cl.
H02J 7/00 (2006.01)
(52) U.S. Cl. ...................................................... 307/65
(58) Field of Classification Search .................. 307/65, 307/66
See application file for complete search history.

(56) References Cited

U.S. PATENT DOCUMENTS

| 6,380,637 B1* | 4/2002 | Hsu et al. ................... 290/1 R |
| 6,881,509 B2* | 4/2005 | Jungreis ...................... 429/23 |
| 6,891,478 B2* | 5/2005 | Gardner ...................... 340/635 |
| 7,411,308 B2* | 8/2008 | Parmley ...................... 290/1 R |

FOREIGN PATENT DOCUMENTS

| JP | 3 284104 | 12/1991 |
| JP | 06-274233 | 9/1994 |
| JP | 8 317566 | 11/1996 |
| JP | 9 215225 | 8/1997 |
| JP | 11 178241 | 7/1999 |

(Continued)

OTHER PUBLICATIONS

U.S. Appl. No. 11/995,203, filed Jan. 10, 2008, Takada.

(Continued)

*Primary Examiner*—Michael Rutland Wallis
(74) *Attorney, Agent, or Firm*—Oblon, Spivak, McClelland, Maier & Neustadt, L.L.P.

(57) ABSTRACT

An electric power supply system which, in the event of a power failure, is capable of efficiently supplying electric power to household electric appliances in cooperation of a vehicle, including a mechanism supplying electric power outside the vehicle, with a stationary fuel cell system and also includes an electric power supply system using a power converter for converting direct current powers from a vehicle fuel cell and a stationary fuel cell into alternating current powers. The electric power supply system is constructed by a vehicle fuel cell provided on a fuel cell vehicle, a stationary fuel cell provided in a stationary power supply system, and a power converter for converting direct current powers from the vehicle fuel cell and the stationary fuel cell into alternating current powers.

5 Claims, 4 Drawing Sheets

FOREIGN PATENT DOCUMENTS

| | | |
|---|---|---|
| JP | 2002 135906 | 5/2002 |
| JP | 2004 48895 | 2/2004 |
| JP | 2004-327404 | 11/2004 |

OTHER PUBLICATIONS

U.S. Appl. No. 12/375,142, filed Jan. 26, 2009, Ohkawara, et al.

U.S. Appl. No. 12/104,055, filed Apr. 16, 2008, Takada et al.

U.S. Appl. No. 12/279,154, filed Aug. 12, 2009, Ohkawara.

U.S. Appl. No. 12/293,158, filed Sep. 16, 2008, Kuwaba.

Chinese Office Action dated Jul. 12, 2010 with English translation in Application No. 2006-80011191, 15 pages.

* cited by examiner

ELECTRIC POWER SUPPLY SYSTEM

TECHNOLOGICAL FIELD

The present invention relates to an electric power supply system with a power converter for converting direct current powers from a vehicle fuel cell and a stationary fuel cell into alternating current powers.

BACKGROUND ART

Generally, in a stationary fuel cell system, a reformer converts reforming fuel into hydrogen, and the hydrogen and oxygen in the atmosphere are supplied to a fuel cell and are reacted to generate electric power, which is supplied to private load devices being electric appliances such as light, TV, washer, air conditioner, refrigerator and the like. However, in the event of a power failure wherein the power supply from a system power source is cut off, the stationary fuel cell is also stopped. Therefore, a measure in the event of a power failure has to be taken into account.

Heretofore, in Patent Document 1 for example, there is described an electric power supply device for power failure which utilizes a battery of an electric vehicle in the event of a power failure to supply emergency electric power to electric appliances for household use. The electric power supply device for power failure described in Patent Document 1 is operated in such a way that upon detection of a power failure, the direct current power charged in the battery of the electric vehicle is supplied to a DC/AC converter, from which electric power is supplied to various electric appliances inside the house through a circuit breaker.

The aforementioned Patent Document 1 also describes, as another embodiment, one which is provided with solar cell panels and a storage battery besides the battery, wherein upon detection of a power failure, the electric power charged in the battery and the storage battery is supplied to various electric appliances, and the electric power from the solar cell panels is also supplied thereto in the case that the sunbeam in the daytime is sufficiently irradiated on the solar cell panels.

Further, in Patent Document 2, there is described an energy generating system, which is provided with a stationary power generating device for supplying electric power to private load devices of an independent house and an onboard power generating device mounted on an electric vehicle. In the system, when the electric power generated by the stationary power generating device is over the consumption by the private load devices, the surplus electric power is supplied to the battery of the electric vehicle, or when the electric power generated by the stationary power generating device is less than the consumption by the private load devices, the shortfall is replenished from the battery of the electric vehicle, so that the transfer of electric power can be done therebetween.

Patent Document 1: Japanese unexamined, published patent application No. 11-178241 (paragraphs 0022, 0049, 0050 and FIGS. 1 and 5)

Patent Document 2: Japanese unexamined, published patent application No. 2004-48895 (paragraphs 0019, 0035 and FIG. 1)

DISCLOSURE OF THE INVENTION

Problem to be Solved by the Invention

In the device described in the aforementioned Patent Document 1, since the onboard battery is used to cope with a power failure, there is a risk that the power interruption occurs at an early stage in dependence on the remaining battery life. Further, in the device of the construction having the separate storage battery, the cost and the space therefor have to be secured, and upon occurrence of a power failure in the nighttime, it cannot be done to sufficiently utilize the function of the solar cell panels. That is, either of the systems is nothing but a temporary measure. In addition, a plurality of circuit breakers are required, and this gives rise to problems that not only an increase in cost is brought about, but special engineering works are also needed.

Further, the system described in the aforementioned Patent Document 2 has an advantage of being capable of transferring electric power between the stationary power generating device and the onboard power generating device, but is of the construction that electric power cannot be supplied to the private load devices with the stationary power generating device being stopped, thereby giving rise to another problem that electric power supply cannot be done during a power failure.

The present invention has been made for solving the aforementioned problems, and an object thereof is to provide an electric power supply system capable of efficiently supplying electric power to electric appliances for household use during a power failure through the cooperation of a vehicle having means for supplying electric power outside the vehicle with a stationary fuel cell system. It is also an object of the present invention to provide an electric power supply system which uses a power convertor for converting direct current powers from a vehicle fuel cell and a stationary fuel cell into alternating current powers.

Measures for Solving the Problem

In order to solve the aforementioned problems, in the present invention in a first aspect, there is provided an electric power supply system, which comprises a vehicle provided with a vehicle fuel cell, a stationary fuel cell system with an inverter, load devices supplied with electric power from the stationary fuel cell system, and a system power source for supplying electric power to the stationary fuel cell system, wherein in the event of a power failure of the system power source, the fuel cell vehicle and the stationary fuel cell system are brought into connection to supply the load devices with the electric power from the fuel cell vehicle through the inverter of the stationary fuel cell system.

The present invention in a second aspect resides in the electric power supply system in the first aspect, wherein the fuel cell vehicle is provided with a storage battery to supply the electric power of the storage battery outside the fuel cell vehicle.

The present invention in a third aspect resides in an electric power supply system, which comprises a fuel cell vehicle provided with a vehicle fuel cell, a stationary fuel cell system with an inverter, load devices supplied with electric power from the stationary fuel cell system, a system power source for supplying electric power to the stationary fuel cell system, and a user interface for controlling the operations of the load devices, wherein in the event of a power failure of the system power source, the fuel cell vehicle and the stationary fuel cell system are brought into connection to supply the load devices with the electric power from the fuel cell vehicle through the inverter of the stationary fuel cell system and wherein the operating states of the load devices are monitored by the user interface.

The present invention in a fourth aspect resides in the electric power supply system in the third aspect, wherein the fuel cell vehicle is provided with a storage battery for supplying electric power outside the fuel cell vehicle and wherein the user interface monitors the remaining battery life of the storage battery and charges the storage battery if the remaining battery life is short.

The present invention in a fifth aspect resides in an electric power supply system, which comprises a vehicle fuel cell provided on a fuel cell vehicle, a stationary fuel cell provided in a stationary power supply system, and a power converter for converting direct current powers from the vehicle fuel cell and the stationary fuel cell into alternating current powers.

The present invention in a sixth aspect resides in the electric power supply system in the fifth aspect, wherein at least one of the fuel cell vehicle and the stationary power supply system s provided with a DC/DC converter for controlling the ratio between output powers from the vehicle fuel cell and the stationary fuel cell.

EFFECTS OF THE INVENTION

In the present invention in the first aspect as constructed above, since in the event of the power failure of the system power source, the fuel cell vehicle and the stationary fuel cell system are brought into connection to supply the load devices with the electric power from the fuel cell vehicle through the inverter of the stationary fuel cell system, it becomes possible to efficiently supply electric power to the load devices by utilizing the fuel cell vehicle and without adding any particular device.

In addition, since the fuel cell vehicle and the stationary fuel cell system can be constructed by respectively using fuel cells of the same kind, the alternation in the system construction can be suppressed to the minimum.

In the present invention in the second aspect as constructed above, since the fuel cell vehicle is provided with the storage battery and since the electric power of the storage battery is supplied outside the fuel cell vehicle, it becomes possible to supply the load devices with electric power by utilizing the storage battery provided on the fuel cell vehicle. In addition, the power supply becomes possible immediately after the fuel cell vehicle and the stationary fuel cell system are brought into connection, by utilizing the electric power of the storage battery, and thus, the system is excellent in terms of a rapid response.

In the present invention in the third aspect as constructed above, since the operating states of the load devices are monitored by the user interface, appropriate steps for a load device consuming a high electric power can be taken in the event of a power failure in such a way, for example, that the operation of the load device is restricted or the load device is made not to operate even upon turning-on of a switch for the load device where the output power of the inverter exceeds the maximum output power therefor.

In the present invention in the fourth aspect as constructed above, since the user interface monitors the remaining battery life of the storage battery and charges the storage battery if the remaining battery life is short, it can be done easily to maintain the storage battery always in a storage state which is needed and sufficient to supply electric power to the load devices, so that it becomes unnecessary to start the fuel cell vehicle unnecessarily.

In the present invention in the fifth aspect as constructed above, the electric power supply system is composed of the vehicle fuel cell provided on the fuel cell vehicle, the stationary fuel cell provided in the stationary power supply system, and the power converter for converting the direct current powers from the vehicle fuel cell and the stationary fuel cell into alternating current powers. Therefore, the direct current power supply of the vehicle and the direct current power supply of the stationary one can be constructed by the power supplies (fuel cells) of the same kind, so that it can be realized to minimize alterations in the control and construction of the power converter. In addition, since an existing power converter can be commonly used in converting the electric powers from the direct current power supply of the vehicle and the direct current power supply of the stationary one into alternating current powers, the electric power supply system can be realized to be simplified in construction.

In the present invention in the sixth aspect as constructed above, since at least one of the fuel cell vehicle and the stationary power supply system is provided with the DC/DC converter for controlling the ratio between the output powers from the vehicle fuel cell and the stationary fuel cell, it can be realized to control the ratio between the output powers from the vehicle fuel cell and the stationary fuel cell by utilizing the existing DC/DC converter.

DESCRIPTION OF REFERENCE SYMBOL 10, 50 . . . fuel cell vehicle, 11, 51 . . . onboard fuel cell system (vehicle fuel cell), 12, 55 . . . storage battery, 13, 60 . . . stationary fuel cell system (stationary power supply system), 15, 65 . . . connector, 16 . . . power transmission lines, 17 . . . inverter, 18A-18D, 64 . . . load devices, 19 . . . electromagnetic switch, 20 . . . circuit breaker, 21 . . . system power source, 22 . . . wattmeter, 23 . . . user interface, 31 . . . server, 32 . . . monitor, 33 . . . battery, 54 . . . first DC/DC converter, 56 . . . inverter, 57 . . . electric motor, 61 . . . stationary fuel cell, 62 . . . second DC/DC converter, 63 . . . power converter (DC/AC converter).

PREFERRED EMBODIMENTS FOR PRACTICING THE INVENTION

Figure 1:
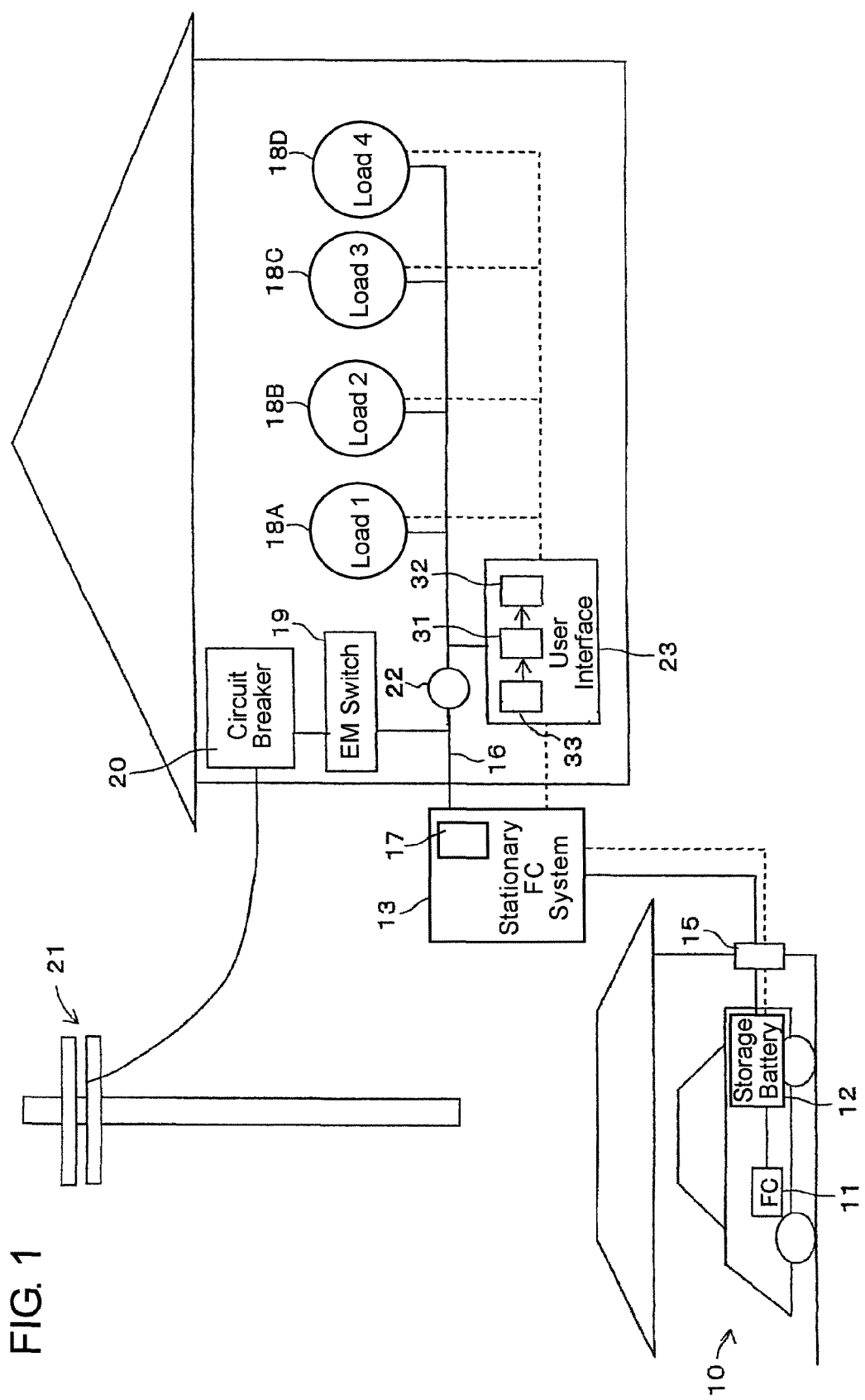
FIG. 1 is a schematic view showing an electric power supply system in a first embodiment according to the present invention.

Hereafter, embodiments of the present invention will be described with reference to the drawings. FIG. 1 is a schematic view showing an electric power supply system. Numeral 10 denotes a fuel cell vehicle, on which there are mounted an onboard fuel cell system 11 and a storage battery 12 as a high voltage power supply for storing the electric power generated in the onboard fuel cell system 11. Numeral 13 denotes a stationary fuel cell system. The storage battery 12 of the fuel cell vehicle 10 is connectable to a connector 15 provided in a garage or the like whenever necessary, and the connector 15 is connected to the stationary fuel cell system 13 usually.

As well known, the onboard fuel cell system 11 is composed of a fuel tank for storing hydrogen and a fuel cell stack or the like which uses hydrogen as fuel gas fed from the fuel tank and air as oxidizing gas fed from a compressor or the like for generating electric power through an electrochemical reaction. Instead, the onboard fuel cell system 11 may be a system which is provided with a fuel tank for storing reforming fuel like alcoholic fuel such as methanol or the like or hydrocarbon fuel such as natural gas, propane gas, gasoline or the like, a water tank, and a reformer for generating reforming gas containing hydrogen as the main component or constituent, from the reforming fuel and water and which utilizes the reforming gas as fuel gas.

The stationary fuel cell system 13 is composed of a reformer for generating reforming gas containing hydrogen as the main constituent, from the reforming fuel, and a fuel cell stack or the like utilizing the air fed from the compressor or the like as oxidizing gas to generate electric power through an electrochemical reaction. As the reforming fuel, there is generally used hydrocarbon fuel such as natural gas, propane gas, kerosene or the like, and there can be used any other fuel like the alcoholic fuel such as methanol or the like which is capable of generating hydrogen by way of reforming. The stationary fuel cell system 13 is low (e.g., several kilowatts) in output power in comparison with the onboard fuel cell system 11. This is to optimize the overall efficiency of the system with the state of power consumption at the household or the like taken into consideration.

The stationary fuel cell system 13 has an inverter 17 built therein for converting the direct current power generated in this system 13 into alternating current power. The inverter 17 is connected via power transmission lines 16 to a plurality of load devices 18A-18D comprising household electric appliances installed in the house and supplies the load devices 18A-18D with the alternating current power outputted from the inverter 17.

The load devices 18A-18D are electric appliances such as light, iron, TV, washer and so on and include those electric appliances which are automatically turned on or off such as heater built-in low table, electric carpet, air conditioner, refrigerator and the like. Further, the power transmission lines 16 are connected to a system power source 21 for commercial use through an electromagnetic switch 19 and a circuit breaker 20, and the stationary fuel cell system 13 is operated by the electric power supplied from the system power source 21. Then, when the total consumed electric power of the load devices 18A-18D exceeds the quantity of electric power generation by the stationary fuel cell system 13, the shortfall of electric power is received from the system power source 21 to be replenished. A wattmeter 22 is provided for detecting a consumed electric power consumed by the load devices 18A-18D, and the total consumed electric power of all the load devices 18A-18D used in the house is detected by the wattmeter 22. Further, the electromagnetic switch 19 is automatically cut off in the event of a power failure and thus, prevents the privately generated electric power from flowing reversely toward the system power source 21 side.

Numeral 23 denotes a user interface provided in the house. The user interface 23 utilizes a network for the household electric appliances to take information necessary for the control of the household electric appliances and to transmit the necessary information to the user. The user interface 23 is composed primarily of a server 31, a monitor 32 with a remote controller, a low consumption battery 33 and the like. The user interface 23 is connected to the inverter 17, the load devices 18A-18D and the wattmeter 22 and has a function of monitoring the operating states of the load devices 18A-18D and controlling the operations of the load devices 18A-18D if the total consuming power load on the load devices becomes heavy too much. Further, the user interface 23 has another function of monitoring the remaining battery life of the storage battery 12 of the fuel cell vehicle 10 while the fuel cell vehicle 10 and the stationary fuel cell system 13 are connected through the connector 15, and of prompting the fuel cell vehicle 10 to start so that the onboard fuel cell system 11 performs power generation, when the remaining battery life is short.

Figure 2:
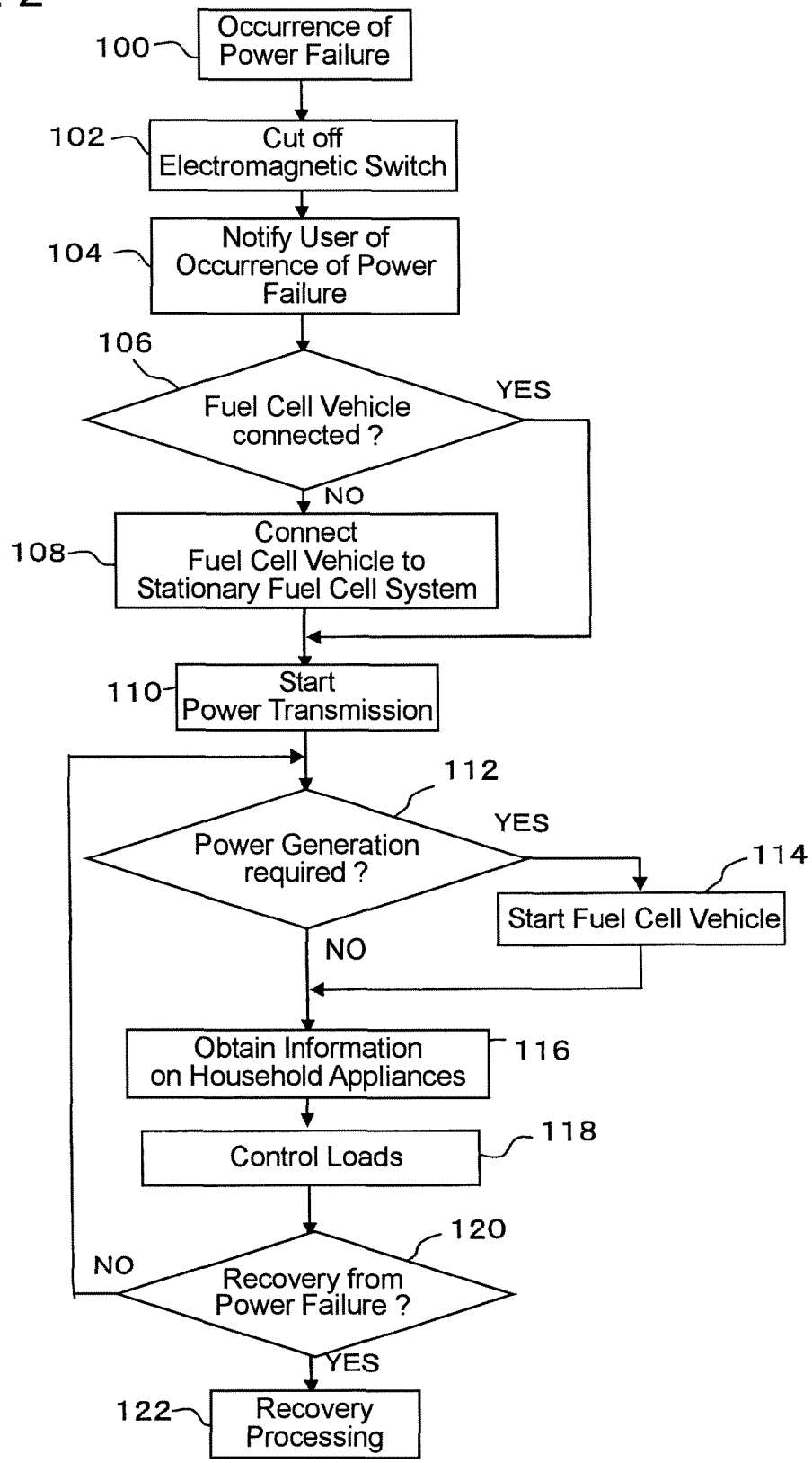
FIG. 2 is a chart showing the flow of processing in the event of a power failure.

The operation of the embodiment as aforementioned will be described in accordance with a flow chart shown in FIG. 2. Upon occurrence of a power failure (step 100), such a power failure is detected by the inverter 17 based on the conductive state on the secondary side of the circuit breaker 20. Thus, a change-over contact of the electromagnetic switch 19 is automatically cut off (step 102) to prevent electricity from flowing toward the system power source 21 side. At the same time, the user interface 23 obtains information on power failure detection from the inverter 17. Based upon this, the user interface 23 executes a processing necessary to convey the occurrence of the power failure to the user (step 104). That is, the user interface 23 displays the occurrence of the power failure on the monitor 32 or notifies the user of such occurrence by voice or alarming sound and displays or conveys by voice a message for instructing the connection of the connector 15, so that it becomes possible to utilize the electric power of the storage battery 12 of the fuel cell vehicle 10.

Further, where the stationary fuel cell system 13 has been in the operating state upon occurrence of a power failure, the stationary fuel cell system 13 is brought into a power failure mode with the occurrence of the power failure, in which power failure mode, the stationary fuel cell system 13 is made to stop the power generation for the household use and causes its system main component only to remain in the state of a single self-operation. In the power failure mode, the stationary fuel cell system 13 is operated only for cooling down itself and discontinues the power generation.

When stopping the stationary fuel cell system 13, a stop mode is needed to be executed with the power supply from the outside. However, because no power supply is given in the event of a power failure, it is likely that the stopping is made without executing a stop sequence, which would adversely influence on the system. Further, once stopped, the stationary fuel cell system 13 takes much time until it generates electric power upon restarting after the recovery from the power failure, and therefore, there takes place a useless consumption of energy where the single self-operation is not continued.

For the reasons mentioned above, in the case of a simple power failure that for example, the circuit breaker is cut off due to the excess electric power in the home, the recovery from the state of the power failure can be done immediately by restoring the circuit breaker, and therefore, the stationary fuel cell system 13 is operated to restart the power generation after the lapse of a predetermined period of time (e.g., five minutes or so) from the state of the single self-operation. In the case that the power failure continues for a long time due to the failure on the system power source side, it is unable to grasp what problem is happening outside, in which case it is judged that the stationary fuel cell system 13 should be stopped, and by utilizing the storage battery 12 of the fuel cell vehicle 10, operation is performed to stop the stationary fuel cell system 13 safely in the stop mode.

By the way, it is often the case that the storage battery 12 and the connector 15 remain disconnected usually for making the fuel cell vehicle 10 ready for driving. Therefore, where the connector 15 is not in the connection state upon occurrence of a power failure (step 106, 108), the connector 15 is brought into the connection state in accordance with an instruction from the aforementioned user interface 23 or on the user's own initiative, whereby the storage battery 12 of the fuel cell vehicle 10 is connected to the stationary fuel cell system 13. By the connection of the connector 15, the power transmission by the storage battery 12 of the fuel cell vehicle 10 is started (step 110), and the electric power of the storage battery 12 is supplied to the inverter 17 of the stationary fuel cell system 13. Thus, the direct current power from the storage battery 12 is converted by the inverter 17 into alternating current power of AC100V, whereby a state is made in which the alternating current power can be supplied to the respective load devices 18A-18D in the house. However, the quantity of the power consumption available actually is controlled by the user interface, as referred to later.

On the other hand, the user interface 23 makes a judgment of whether or not a sufficient electricity has been stored in the storage battery 12 and another judgment of whether or not, the fuel cell vehicle 10 has been started. Where the sufficient electricity has not been stored in the storage battery 12 and the fuel cell vehicle 10 has not been started, there is made a judgment that power generation is necessary (step 112), and the fuel cell vehicle 10 is prompted to start by displaying on the monitor 32 information that the starting of the fuel cell vehicle 10 is needed, or by transmitting such information by voice. At this time, where a person takes the driver's sheet of the fuel cell vehicle 10, it is possible to make a similar display or voice on a vehicle monitor and to give a warning that the fuel cell vehicle 10 should not be run.

When the fuel cell vehicle 10 is started (step 114) to bring the onboard fuel cell system 11 into operation, the same starts to generate electric power and charges the storage battery 12. In this case, it is also possible to transmit an instruction from the user interface 23 wirelessly to the fuel cell vehicle 10 and to automatically start the fuel cell vehicle 10 to bring the onboard fuel cell system 11 into operation.

Upon confirmation that a sufficient electricity has been stored in the storage battery 12, the user interface 23 obtains information on the household appliance (step 116) and makes the server 31 control the operations of the load devices 18A-18D in the house (step 118). More specifically, for example, in the case of a house or store wherein a network system has been installed for digital household electrical appliances and the like, if the total consumed power used indoors exceeds the maximum output power for the inverter 17, the user interface 23 supplies electricity on a priority basis to required appliances only which have been registered in advance, and transmits stop signals to other appliances which have not been registered, to bring such other appliances into the state that they do not operate even when turned on. Alternatively, to a digital household electrical appliance which is heavy in load like microwave oven for example, the user interface 23 automatically transmits a signal disabling such an appliance to use, so that the same cannot be used even if tried to use on the user side.

Further, this aside, the user interface 23 may be enabled to supply electricity in turn to the appliances which have been turned on. In this case, the present total consumed electric power detected by the wattmeter 22 is monitored all the time, wherein the consumed electric power of an appliance which has been turned on is checked next. If it does not exceed the maximum output power for the inverter 17, such an appliance is enabled to operate. If the consumed electric power exceeds the maximum output power, on the contrary, such an appliance is controlled not to operate. However, it is preferable even in this case that because of being in an abnormal state like power failure, the appliance which is heavy in load should be beforehand set not to be operated even when the user turns on the switch therefor.

In the case of those which are other than the digital household electrical appliances and which are disconnected from the network, most of those are started by the use of the standby power only after the recovery from a power failure, and therefore, the user confirms the present consumed quantity by checking the monitor 32 or the like. For example, in the case of a conventional microwave oven, there is activated a function of issuing from the monitor 32 an indication to avoid the use and of causing the inverter 17 to stop the output power thereto even when the power-on is forced.

The inverter 17 is able to detect the recovery from a power failure based on the conductive state on the secondary side of the circuit breaker 20. Upon recovery from the power failure (step 120), the user interface 23 obtains detection information regarding the recovery from the power failure, tells the user about the recovery from the power failure by voice or display, and prompts a power failure recovery processing (step 122). Thus, the user performs necessary recovery processing such as disconnecting the connector 15, turning on the change-over contact of the electromagnetic switch 19 and the like. Where the recovery from the power failure is not judged at step 120, the aforementioned judgment (step 112) regarding the requirement for power generation is made continuously. It is possible to automatically bring the change-over contact of the electromagnetic switch 19 into connection upon recovery from the power failure.

Although the operation of the foregoing embodiment has been described taking an example that the stationary fuel cell system 13 is stopped during a power failure, the operation can also be performed in other control modes as described hereinafter.

A. In the Case of Stationary Fuel Cell System 13 Remaining Stopped Upon Occurrence of Power Failure:

(1) Upon occurrence of a power failure, the stationary fuel cell system 13 is brought into connection to the fuel cell vehicle 10, and the stationary fuel cell system 13 is started after the starting of the fuel cell vehicle 10. The starting of the stationary fuel cell system 13 is made after it is confirmed that a supply system for reforming fuel is operating properly (detected from the gas pressure or the like).

B. In the Case of Stationary Fuel Cell System 13 Remaining in Operation Upon Occurrence of Power Failure:

(1) Upon occurrence of a power failure, the stationary fuel cell system 13 is brought into a stop mode and then, is brought into connection to the fuel cell vehicle 10. Where the recovery from the power failure is not made even after the lapse of a predetermined period of time (e.g., one hour) subsequent to the starting of the fuel cell vehicle 10, the stationary fuel cell system 13 is stopped for the likelihood that an abnormality has also occurred with the supply system for reforming fuel.

(2) Where the stationary fuel cell system 13 is properly operating upon occurrence of a power failure, the stationary fuel cell system 13 is left in operation and is brought into connection to the fuel cell vehicle 10, and the fuel cell vehicle 10 is then started.

(3) Where an abnormality has occurred with the supply system for reforming fuel upon occurrence of a power failure, the stationary fuel cell system 13 is brought into the stop mode, is brought into connection to the fuel cell vehicle 10, and is stopped after the starting of the fuel cell vehicle 10.

(4) Upon occurrence of a power failure, the stationary fuel cell system 13 is brought into the stop mode and is brought into connection to the fuel cell vehicle 10. After the subsequent starting of the fuel cell vehicle 10, the stationary fuel cell system 13 is restored to the operation mode where the supply system for reforming fuel is properly operating, but is stopped if an abnormality has occurred with the supply system for reforming fuel.

According to the aforementioned embodiment, during a power failure, the fuel cell vehicle 10 and the stationary fuel cell system 13 are brought into cooperation, wherein the electric power can be supplied from the storage battery 12 of the fuel cell vehicle 10 through the inverter 17 of the stationary fuel cell system 13 to the load devices 18A-18D installed in the house. Thus, it becomes possible to supply the electric power to the load devices 18A-18D installed in the house by utilizing the storage battery 12 of the fuel cell vehicle 10. Further, it becomes possible to control the load devices 18A-18D appropriately by suppressing the operations of the load devices 18A-18D not to exceed the maximum output power for the inverter 17. In addition, since the remaining battery life of the storage battery 12 of the fuel cell vehicle 10 is monitored by the user interface 23, the fuel cell vehicle 10 should be started in the case of the remaining battery life being insufficient, whereas it is not required to start the fuel cell vehicle 10 unless need be.

The stationary fuel cell system 13 may be of the type that generates electric power by utilizing the hydrogen stored in the tank. Further, if a city gas system capable of supplying hydrogen became a reality, the stationary fuel cell system 13 would be of the type that utilizes the hydrogen to generate electric power. The reformer would become unnecessary in these stationary power generation systems utilizing hydrogen.

Although the foregoing embodiment has been described taking an example that the stationary fuel cell system 13 is brought into connection to the fuel cell vehicle 10 upon occurrence of a power failure so that electric power is supplied to the load devices 18A-18D in the house by utilizing the storage battery 12 mounted on the fuel cell vehicle 10, the present invention can be implemented by bringing the stationary fuel cell system 13 into connection to a fuel cell vehicle which does not have any battery, and the present invention is applicable to any vehicle which has means for supplying electric power outside the fuel cell vehicle.

Further, although the foregoing embodiment has been described taking an example that the user interface 23 controls the operations of the load devices 18A-18D not to exceed the maximum output power for the inverter 17 because the same is small in capacity, the same setting as aforementioned is effective also in a stationary fuel cell system having the inverter 17 being sufficiently large in capacity, for the purpose of suppressing the consumed power during a power failure.

Further, although the foregoing embodiment has been described taking an example that the transmission of electricity from the stored battery 12 of the fuel cell vehicle 10 toward the stationary fuel cell system 13 side is initiated immediately upon connection of the connector 15 in the event of a power failure, the transmission of electricity from the stored battery 12 may be carried out under the condition that the remaining battery life of the storage battery 12 is more than a predetermined value. Moreover, it is possible to make the onboard fuel cell system 11 initiate the power generation not by operating the onboard fuel cell system 11 when the remaining battery life of the storage battery 12 is short, but by starting the fuel cell vehicle 10 automatically together with the connection of the connector 15 in the event of a power failure, thereby to initiate the power generation by the onboard fuel cell system 11.

The function of the user interface 23 in the foregoing embodiment has been only to show an example preferred in implementing the present invention. The user interface 23 is not limited to that having been described in the embodiment, and may be constructed as one having at least the function capable of monitoring the operating states of the load devices and controlling the operations of the load devices.

In the foregoing first embodiment, in the event of a power failure, the direct current power of the storage battery 12 of the fuel cell vehicle 10 is converted by the inverter 17 of the stationary type into alternating current power to supply the same to the respective load devices 18A-18D in the house. However, the supply of electric power like this is not necessarily limited to that in the event of a power failure and may be effectively utilized at the load devices 18A-18D in the house, for the purpose of, for example, avoiding the wasting of the surplus energy stored in the storage battery 12. Further, the countermeasure can cope with a situation that the electric power demand at the load devices 18A-18D surpasses the power supply by the stationary fuel cell system 13 alone. The form in such implementation will hereafter be described as a second embodiment with reference to FIGS. 3-5.

Figure 3:
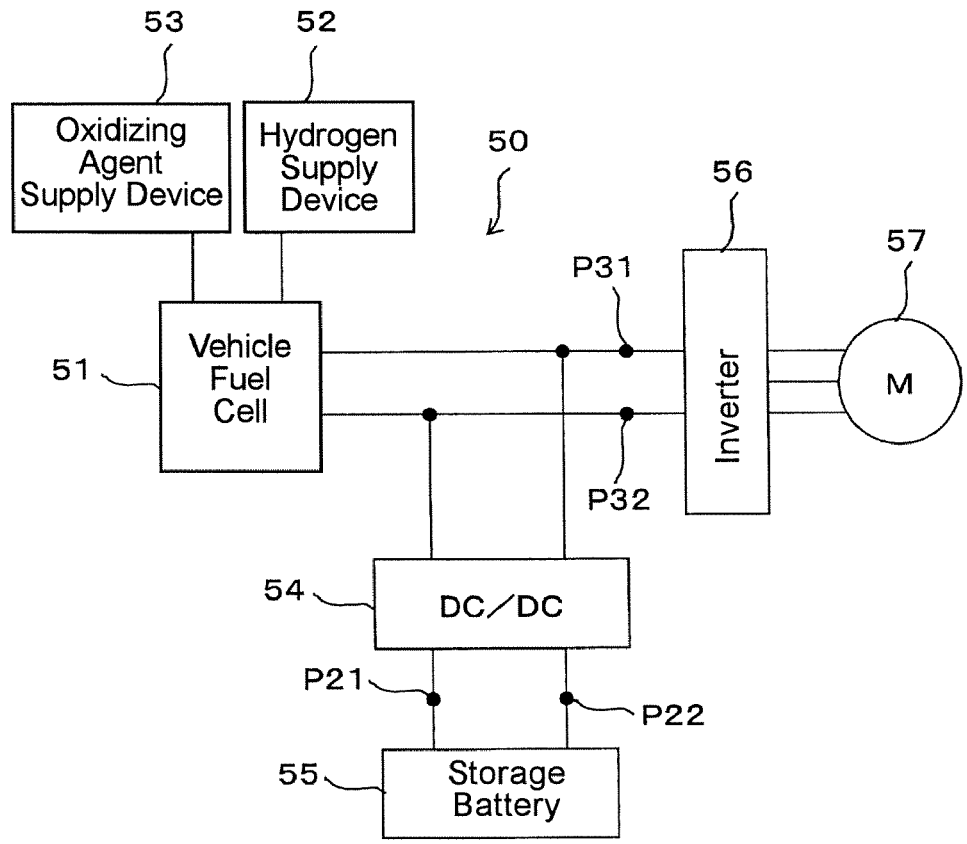
FIG. 3 is a schematic view showing the construction of a fuel cell vehicle in an electric power supply system in a second embodiment according to the present invention.

FIG. 3 is a schematic view showing the construction of a fuel cell vehicle 50 in the second embodiment according to the present invention. In FIG. 3, a hydrogen supply device 52 is a hydrogen storage device such as, e.g., a hydrogen tank or the like for storing hydrogen, or is a reforming device for reforming hydrogen-containing fuel, and supplies hydrogen gas to the vehicle fuel cell 51. An oxidizing agent supply device 53 is, for example, an air compressor and supplies the vehicle fuel cell 51 with an oxidizing agent such as oxygen-containing air. The vehicle fuel cell 51 generates electric power upon receiving the hydrogen and the oxidizing agent and applies direct current voltage to a storage battery 55 and an inverter 56.

The storage battery 55 is, for example, a secondary battery or a capacitor and is a direct current power supply having a function of charging the electric power from the vehicle fuel cell 51 and regenerative electric power by an electric motor, referred to later, and another function of discharging the charged electric power.

The vehicle fuel cell 51 and the storage battery 55 are connected to the inverter 56 in parallel relation, and a first DC/DC converter 54 is interposed between the power transmission lines, connecting the vehicle fuel cell 51 with the inverter 56, and the storage battery 55. The first DC/DC converter 54 is a step-up/down converter and executes controlling the power supply from the vehicle fuel cell 51 to the storage battery 55 and controlling the output power ratio between the vehicle fuel cell 51 and the storage battery 55. The first DC/DC converter 54 can also be used to control the output power ratio between a later-mentioned stationary fuel cell 61 and the vehicle fuel cell 51, the respect of which will be referred to later. The first DC/DC converter 54 may be provided between the power transmission lines, connecting the storage battery 55 to the inverter 56, and the vehicle fuel cell 51. That is, arrangements in FIG. 3 may be replaced between the vehicle fuel cell 51 and the storage battery 55. The electric motor 57 is connected at its rotor to a wheel axle (not shown) and rotates the wheel axle in dependence on the alternating electric power supplied from the inverter 56.

Figure 4:
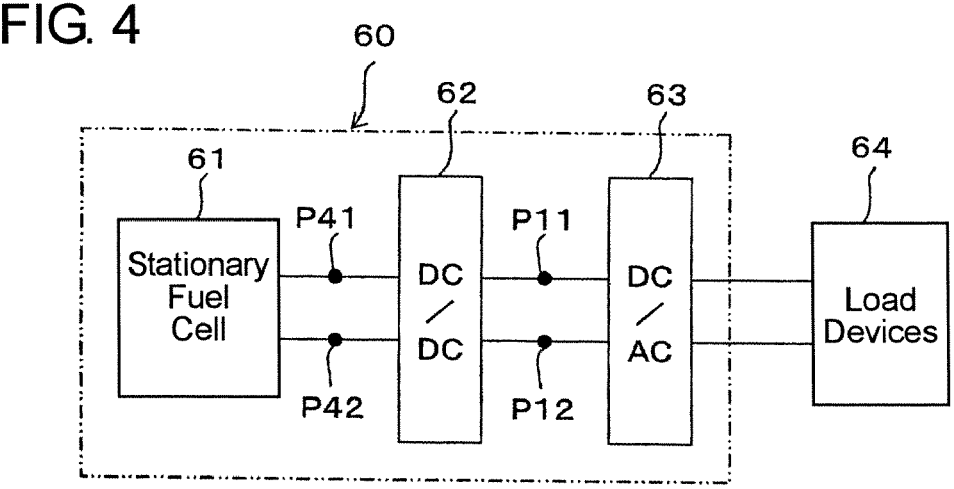
FIG. 4 is a schematic view showing the construction of a stationary power supply system in the electric power supply system in the second embodiment according to the present invention.

FIG. 4 is a schematic view showing the construction of a stationary power supply system 60 of the installation type in the second embodiment. In FIG. 4, the stationary fuel cell 61 is, for example, a fuel cell which is lower in output power than the vehicle fuel cell 51 (e.g., a fuel cell which is fewer in the number of cells), and the direct current power from the stationary fuel cell 61 is supplied to a DC/AC converter 63 through a second DC/DC converter 62. The second DC/DC converter 62 is a voltage converter and boosts the output power from the stationary fuel cell 61 to supply the boosted output power to the DC/AC converter 63. It is possible to omit the second DC/DC converter 62. The DC/AC converter 63 converts the direct current power from the stationary fuel cell 61 into alternating current power and supplies the same to load devices 64 comprising household electric appliances installed in the house.

Next, description will be described regarding the construction which supplies the electric powers from the vehicle fuel cell 51 and the stationary fuel cell 61 through the DC/AC converter 63 constituting a stationary power converter. In rough classification in the way of connecting, there are a construction in which the vehicle fuel cell 51 and the stationary fuel cell 61 are connected in parallel and another construction in which they are connected in series.

Figure 5:
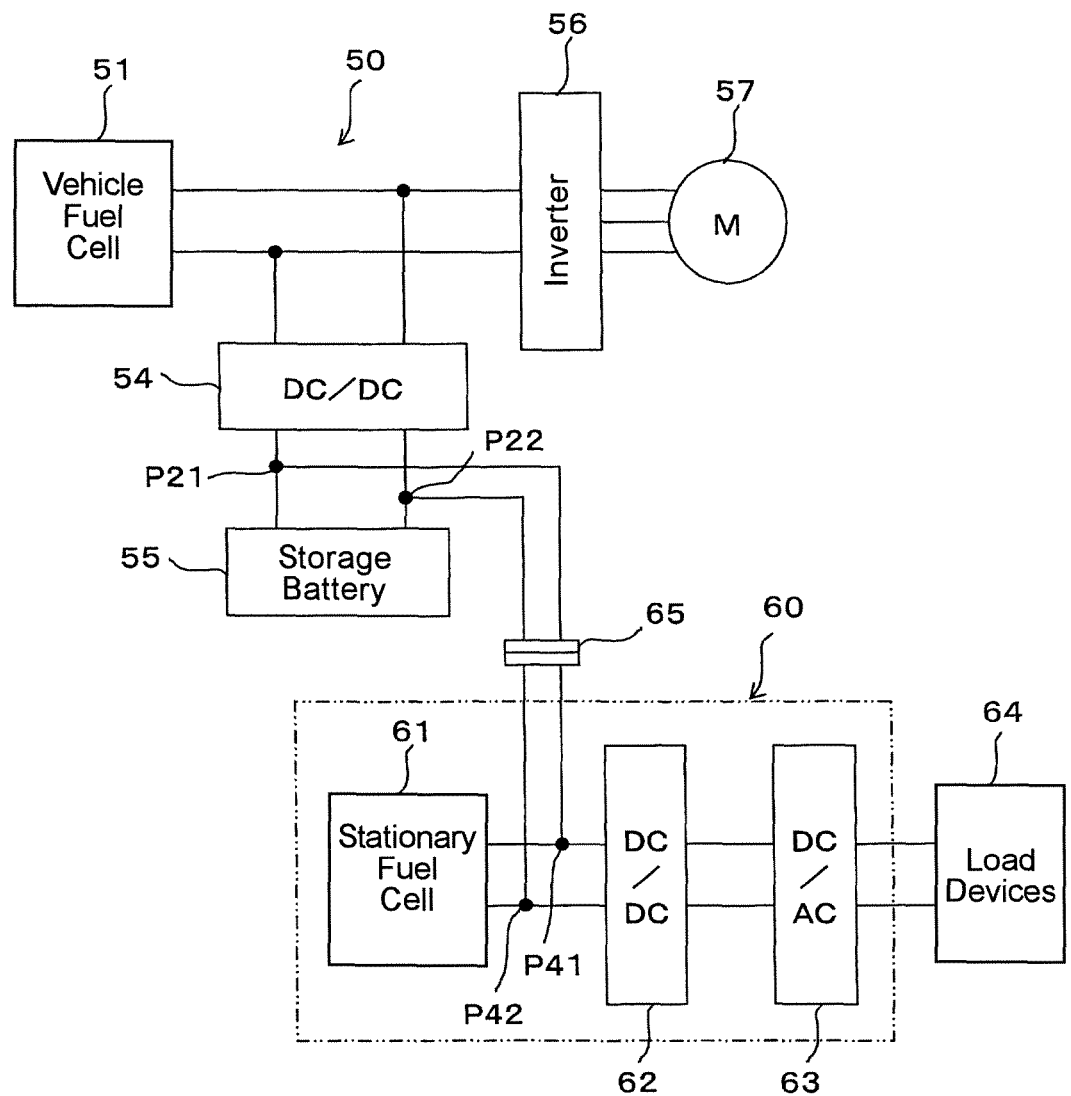
FIG. 5 is a schematic view of the electric power supply system in the second embodiment according to the present invention, exemplifying the connection between the fuel cell vehicle and the stationary power supply system.

First of all, description will be made regarding the form that the vehicle fuel cell 51 and the stationary fuel cell 61 are connected in mutually parallel relation to the stationary power converter (DC/AC converter 63) as shown in FIG. 5 and that electric powers are outputted from the respective fuel cells 51, 61. Here, because the respective fuel cells 51, 61 have respective supplies of reaction materials (hydrogen, oxidizing agent) controlled individually in dependence on their operating points (levels in electric power), a requirement that the output powers from the respective fuel cells 51, 61 are desired to be individually controlled arises in the case of outputting the electric powers from the two fuel cells 51, 61 through the common power converter (DC/AC converter 63). To meet this requirement, in the present embodiment, the ratio between the output powers from the respective fuel cells 51, 61 is controlled by the use of the first DC/DC converter 54 provided for the fuel cell vehicle 51 or the second DC/DC converter 62 provided for the stationary power supply system 61. In other words, there is taken a construction that uses the existing configurations not only for the stationary DC/AC converter 63 but also for the output power ratio control of the first DC/DC converter 54 in generating output power.

Specifically, the points P21, P22 on the power transmission lines which connect the vehicle fuel cell 51 to the inverter 56 in FIG. 3 and the points P41, P42 on the power transmission lines which connect the stationary fuel cell 61 to the second DC/DC converter 62 in FIG. 4 are mutually connected through an interface such as a connector 65 or the like as shown in FIG. 5, whereby the respective fuel cells 51, 61 parallel supply the load devices (external appliances) 64 with electric powers through the stationary DC/AC converter 63. In this construction, the output power ratio between the respective fuel cells 51 and 61 is controlled by the first DC/DC converter 54 on the fuel cell vehicle 50 side. In this case, the output power from the vehicle fuel cell 51 flows in the order of vehicle fuel cell 51→first DC/DC converter 54→second DC/DC converter 62→DC/AC converter 63→load devices (external appliances) 64. The output power from the stationary fuel cell 61 flows in the order of stationary fuel cell 61→second DC/DC converter 62→DC/AC converter 63→load devices (external appliances) 64. In this construction, the output power distribution is performed by the DC/DC converter 54 which is installed on the side of the fuel cell (vehicle fuel cell 51) with a relatively higher output power of the two fuel cells 51, 61. Thus, this construction is advantageous in that the band of the DC/DC converter 62 installed on the side of the fuel cell (i.e., the stationary fuel cell 61) with a relatively lower output power is not needed to be adjusted to the band of the vehicle fuel cell 51.

As another construction, by connecting the points P31, P32 on the power transmission lines in FIG. 3 to the points P11, P12 on the power transmission lines in FIG. 4, the respective fuel cells 51, 61 may parallel supply the electric powers through the stationary DC/AC converter 63. In this construction, the ratio of the output power (including negative power during charging) from the storage battery 55 to the total output power of the respective fuel cells 51, 61 is controlled by the first DC/DC converter 54 on the vehicle fuel cell 51 side, while the output power ratio between the respective fuel cells 51, 61 is controlled by the second DC/DC converter 62 on the stationary fuel cell 61 side. The output power from the vehicle fuel cell 51 flows in the order of vehicle fuel cell 51→DC/AC converter 63→load devices (external appliances) 64. The output power from the stationary fuel cell 61 flows in the order of stationary fuel cell 61→second DC/DC converter 62→DC/AC converter 63→load devices (external appliances) 64. This construction is advantageous in that the storage battery 55 of the fuel cell vehicle 50 is made to function as a buffer for the respective fuel cells 51, 61. Here, term "buffer" means the construction that the storage battery 55 charges a surplus electric power when the electric power generated by the fuel cell 51 or 61 is higher than the demand electric power of the load devices 64, while the storage battery 55 also supplies the electric power to the load devices 64 when the demand electric power of the load devices 64 surpasses the electric power generated by the fuel cell 51 or 61. Where the storage battery 55 is made to function as the buffer for electric power in this manner, the generation of electricity is performed as the operating point of at least one of the fuel cells is fixed (preferably, fixed at the operating point of a high efficiency) or is varied stepwise, and by doing so, the efficiency of the system can be enhanced in comparison with the generation of electricity under a drifting control which complies with the demand from the load devices 64. Such power generation control, the foregoing output power ratio control between the fuel cells 51, 61, and the like are controlled by the user interface 23 and the onboard computer described in the first embodiment.

Although in the foregoing examples, the fuel cells 51, 61 are connected in parallel relation to the DC/AC converter 63, they may be connected in series.

In the use other than in the event of a power failure as described in the second embodiment, it may be done upon supply of electric power to manually cut off the electromagnetic switch 19 described in the first embodiment or to automatically cut off the electromagnetic switch 19 at the same time as the connection of the connector 65.

As described above, the second embodiment is constructed by the vehicle fuel cell 51 provided on the fuel cell vehicle 50, the stationary fuel cell 61 provided in the stationary power supply system 60, and the DC/AC converter (power converter) 63 for converting the direct current powers from the vehicle fuel cell 51 and the stationary fuel cell 61 into the alternating current powers. Thus, it can be realized to construct the vehicle direct current power supply and the stationary direct current power supply by the power supplies (i.e., fuel cells) of the same kind, so that alterations in the control and construction of the DC/AC converter (power converter) 63 can be suppressed to the minimum. In addition, the existing DC/AC converter (power converter) 63 can be used commonly in converting the vehicle direct current power supply and the stationary direct current power supply into alternating current powers, so that it becomes possible to realize an electric power supply system simplified in construction.

In the second embodiment as constructed above, at least one of the fuel cell vehicle 50 and the stationary power supply system 60 is provided with the DC/DC converters 54, 62 for controlling the output power ratio between the vehicle fuel cell 51 and the stationary fuel cell 61. Thus, it becomes possible to control the output power distribution by utilizing the existing DC/DC converters 54, 62 provided in at least one of the fuel cell vehicle 50 and the stationary power supply system 60.

INDUSTRIAL APPLICABILITY

The electric power supply system according to the present invention is suitable for use in converting direct current powers from a vehicle fuel cell and a stationary fuel cell into alternating current powers to supply the same to load devices.

The invention claimed is:

1. An electric power supply system comprising:
   a fuel cell vehicle including a vehicle fuel cell;
   a stationary fuel cell system including an inverter;
   a connector to connect the fuel cell vehicle to the stationary fuel cell system;
   load devices supplied with electric power from the stationary fuel cell system; and
   a system power source to supply electric power to the stationary fuel cell system,
   wherein based on a detection of a power failure of the system power source and a determination that the connector is not connected to the fuel cell vehicle, the fuel cell vehicle and the stationary fuel cell system are brought into connection, by connecting the fuel cell vehicle to the connector, to supply the load devices with electric power from the fuel cell vehicle through the inverter of the stationary fuel cell system.

2. The electric power supply system according to claim 1, wherein the fuel cell vehicle further includes a storage battery to supply the electric power of the storage battery outside the fuel cell vehicle.

3. An electric power supply system comprising:
   a fuel cell vehicle including a vehicle fuel cell;
   a stationary fuel cell system including an inverter;
   a connector to connect the fuel cell vehicle to the stationary fuel cell system;
   load devices supplied with electric power from the stationary fuel cell system;
   a system power source to supply electric power to the stationary fuel cell system; and
   a user interface to control operations of the load devices,
   wherein based on a detection of a power failure of the system power source and a determination that the connector is not connected to the fuel cell vehicle, the fuel cell vehicle and the stationary fuel cell system are brought into connection, by connecting the fuel cell vehicle to the connector, to supply the load devices with electric power from the fuel cell vehicle through the inverter of the stationary fuel cell system, and wherein the operating states of the load devices are monitored by the user interface.

4. The electric power supply system according to claim 3, wherein the fuel cell vehicle further includes a storage battery to supply the electric power outside the fuel cell vehicle, and wherein the user interface monitors remaining battery life of the storage battery and charges the storage battery if the remaining battery life is less than a predetermined value.

5. An electric power supply system comprising:
   a vehicle fuel cell included in a fuel cell vehicle;
   a stationary fuel cell included in a stationary power supply system;
   a power converter to convert direct current powers from the vehicle fuel cell and the stationary fuel cell into alternating current powers;
   a second DC/DC converter to receive and output powers from both the vehicle fuel cell and the stationary fuel cell, the second DC/DC converter being provided between the stationary fuel cell and the power converter;
   a connector to connect the vehicle fuel cell between the second DC/DC converter and the stationary fuel cell;
   a first DC/DC converter provided between the connector and the vehicle fuel cell; and
   a connector to connect the fuel cell vehicle to the stationary power supply system to supply the direct current power from the vehicle fuel cell to the power converter, wherein
   the power converter is built into the stationary power supply system.

* * * * *